June 2, 1936. O. W. HAHN 2,042,462
FLUID FLOW CONTROL DEVICE
Filed Oct. 23, 1934
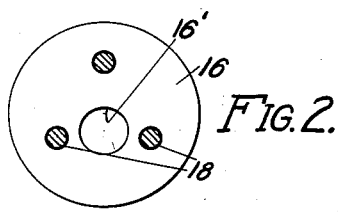
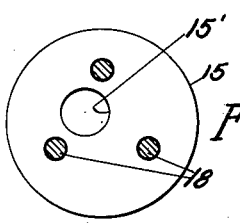
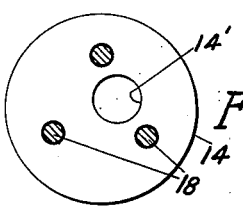
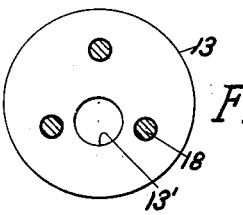
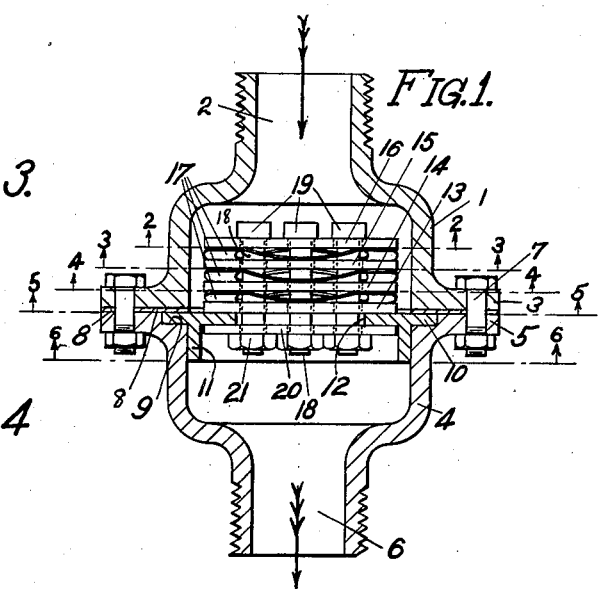
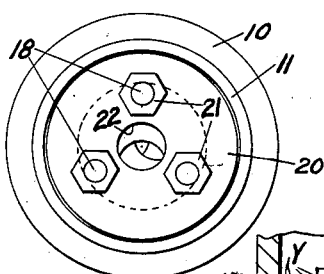
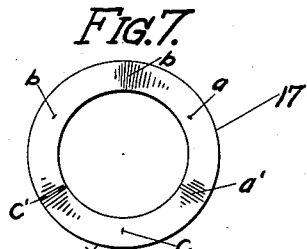
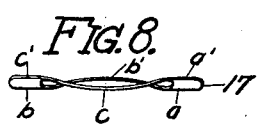
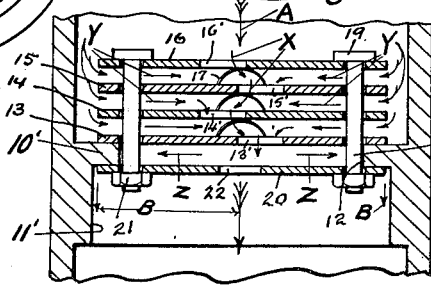
INVENTOR.
OTTO W. HAHN.
BY Miller Boyken & Bried
ATTORNEYS.

UNITED STATES PATENT OFFICE 2,042,462

FLUID FLOW CONTROL DEVICE

Otto W. Hahn, San Francisco, Calif.

Application October 23, 1934, Serial No. 749,569

7 Claims. (Cl. 138—43)

This invention relates to means for controlling the volume or flow of a fluid through a fluid passage, and the objects of the invention are to provide a simple device that is easily installed in the fluid passage and which device will operate to control the flow of a fluid through the fluid passage constant over a wide range of delivery pressure and/or a wide range of discharge heads or back pressures. Other objects and advantages will appear in the description.

Heretofore, insofar as I am aware, practically all efforts to control fluid flow have resolved themselves into an arrangement of sliding sleeves adapted to cut off the full flow of fluid upon changes in dynamic pressure in the fluid pipe or passage. These devices have been generally found to be subject to the same objections, namely, of rapidly oscillating at certain points upon changes in the dynamic pressure of the fluid, thus resulting in a hammering or hum that continues until upset by another change, or else when there is a sudden surge of fluid, the sleeve type devices will tend to, and frequently do, entirely cut off the flow for a greater or lesser duration. Furthermore, such prior devices tend to stick in operation, particularly where an effort is made to prevent leakage between the sleeves, and the cut-off ports also accumulate deposits from the fluid, thus creating a condition that modifies the desired delivery flow. In hot water lines the foregoing objections are magnified, for obvious reasons such as the expansion of the metal of the closely fitting elements, and the more rapid accumulation of impurities in the ports and passages and on the sliding parts. With my device I have overcome the foregoing objections and have procured an accuracy in fluid flow control that is constant over extremely wide variations in dynamic pressure of the fluid, and which device requires no attention after once being placed in the line.

In the drawing, Fig. 1 represents a longitudinal sectional view of a fluid pipe or passage with my device mounted therein and with a portion of the device in section and other portions in elevation.

Figs. 2 to 6 are sectional views of the device of Fig. 1 taken along the lines 2 to 6 of Fig. 1, exclusive of the fluid pipe.

Fig. 7 is a plan view of one of the annular sheet metal spacing springs shown in Fig. 1.

Fig. 8 is an edge or side view of the spring shown in Fig. 7.

Fig. 9 is an enlarged semi-diagrammatic view of the device of Fig. 1 simplified to show the mode of operation.

In detail, 1 is a cylindrical pipe section provided with an inlet 2 at one end and an outwardly projecting flange 3 around the other end. A second similar pipe section 4 has an outwardly projecting flange 5 around one end and an outlet 6 at the opposite end. The flanges 3 and 5 are adapted to be secured together by bolts 7 with the bores of the pipe sections in axial alignment thus providing the portion of the fluid passage in which my device is adapted to be positioned. The inlet and outlet ends of the sections may be externally threaded for connecting in the main pipe line, as indicated.

A gasket 8 is interposed between the flanges 3 and 5, and section 4 may be countersunk around the inner margin of its flanged end as at 9, to seat the outer edge of a flat annular ring 10 therein, which ring is securely held between the flanges when the bolts 7 are tightened. This ring 10 is formed with a perpendicularly extending annular flange 11 extending around the ring intermediate the peripheral and inner edges of the ring, which flange fits within the bore of the pipe section 4 adjacent the flanged end thereof. The inner edge of ring 10 defines a relatively large circular opening 12, which opening is in alignment with the bores of the pipe sections.

The ring 10 constitutes the mounting for all of the remaining elements of my fluid flow control device, and in describing the remaining elements as to their respective positions in the pipe line, I will refer to those positioned on the side of opening 12 within pipe section 1 as being on the "upstream" side, while those elements below opening 12 and within pipe section 4 will be referred to as being on the "downstream" side.

On the upstream side of ring 10 are a row of axially aligned flat, circular disks 13, 14, 15, 16, said disks being centrally aligned in the bore of section 1, and inwardly spaced from the inner side of the bore, and the disks are substantially alike in size. Disk 13 rests on the upstream side of ring 10 around its margin and disks 14, 15, 16 are aligned above disk 13 on the upstream side in that order.

Interposed between each pair of disks is an annular spring 17 of flat sheet metal oppositely bowed therearound in a manner to engage the side of one of the disks at three equally spaced points and to also engage the side of the other disks of the pair at three equally spaced points as at $a$, $b$, $c$, and $a'$, $b'$, $c'$, (see Figs. 7, 8) thereby supporting adjacent disks of the row parallel and providing a radially outwardly opening passage between adjacent disks, the walls of each passage being the adjacent sides of adjacent disks.

Each of the disks is provided with an aperture or orifice therethrough offset on one side of the central axis of each disk and the disks of the row are arranged so that the apertures of adjacent disks are positioned 120 degrees around the central axis extending through the row of disks. Thus the apertures are not in register, but a line extending through said apertures would substantially describe a spiral. The orifices are numbered from 13' to 16' inclusive, orifice 13' being in disk 13 and so on to orifice 16' in disk 16, but seen in Figs. 2 to 5 inclusive.

To retain the disks in alignment with their apertures or orifices in the above described relation, I provide three rods or pins 18, which extend transversely through the disks of the row at three equally spaced points, each disk being provided with openings adapted to freely pass the pins. A slight clearance is left between the pins and the openings in the disks so as to permit the disks to freely slide relative to the pins in the longitudinal direction of the row or pile of disks, but the disks cannot rotate relatively to any material degree.

The pins 18 are headed at 19 outwardly of the end disk 16 and extend at their opposite ends through opening 12 into the space enclosed by flange 11 and pass freely through three equally spaced openings in a circular plate 20 positioned within said space. The three openings in plate 20 are substantially of the same size as the openings in the disks that pass the pins or rods. Nuts 21 are threadedly secured on the lower ends of the pins outwardly of plate 20 and arranged so that when the springs 17 are fully bowed with the maximum spacing between the disks, the heads 19 of the pins engage disk 16 and the nuts 21 will engage plate 20 and disk 14, and plate 20 will respectively engage opposite sides of the ring 10. Thus my control device is a compact unit wholly mounted on ring 10, with no loose parts or sliding sleeves, etc., and is easily and quickly mounted in a pipe line.

It will be noted from the drawing (Fig. 1) that the rods 18 pass within the central opening of the springs 17, thus preventing their displacement from between the disks, and the inner edge of ring 10 also closely approaches the pins, thereby retaining the disks and plate 20 in axial alignment with the opening 12 in ring 10.

The peripheral edge of plate 20 is slightly spaced at its outer edge from the inside wall of flange 11, and is centrally provided with a circular orifice 22. Thus there is a leakage around the edge of the plate 20 that contributes to the effective pull of the plate downstream when the water flows in the pipe line in that direction.

Referring to Fig. 9, instead of showing pipe sections 1, 2, and ring 9 and flange 12 as being separate units, they are indicated as being in one piece for purpose of clarity, although the pipe section itself may, if desired, be the mounting of the disks, etc., as shown in Fig. 1. The members in this view corresponding to ring 10 and flange 11 are numbered 10' and 11' respectively, but the other elements bear the same numbers as they appear in Fig. 1, although here shown more or less diagrammatically, and with openings in the disks in one plane to illustrate the principle of operation.

In Fig. 9 arrows are shown indicating the movement of water through the device. In the upstream side, A indicates the normal directional flow of water in the pipe and B represents the normal directional flow in the downstream side, both directions being the same. Y represents the flow in the upstream side between the adjacent disks and X represents the flow through the disk apertures. In the downstream side a portion of the water flows in the direction of arrows Z and around the edges to change to the direction of the normal downstream flow while a portion of the water flows through orifice 22 in plate 20 in the normal downstream direction. Thus, with the pipe filled and at a certain static pressure, when a valve or discharge opening on the downstream side is opened sufficiently to normally deliver more than the desired volume per minute, were the device not installed, the flow of water will take place as above described.

With respect to time, at any instant the upstream pressure will tend to force the water through the passage formed by the spaced disks and also in a direction at right angles to such flow through the disk apertures, and thereafter against plate 20 and through its orifice and around its edges into the main downstream flow. If the upstream dynamic pressure be less than a minimum of say 5 lbs. no appreciable operation of the connected plate 20 in the downstream flow and disks 13 to 16 in the upstream flow will result. But for any definite upstream pressure between such minimum and a maximum upstream pressure sufficient to collapse the pile of disks to its limit, a definite movement of the disks and plate 20 will take place to a position where they will remain to give constant volume delivery through the disk pile until a change occurs in the upstream pressure or head is added or removed on the downstream side. If an increase in the upstream pressure to a new constant occurs, the disks will close to a position which fixes the total effective orifice through the disk pile to pass the constant quantity for which the device is designed to deliver. If the upstream pressure decreases, the disks will move apart sufficiently to pass the same desired constant quantity. If the upstream or downstream oscillate, the disks will correspondingly oscillate to maintain the delivery constant. Insofar as the plate 20 is concerned, when such changes in pressures are varied its average downstream traction factor is substantially constant and acts to steady the movement of the row of disks, which disks are directly responsive to changes in the dynamic pressure of the water in the line.

From the foregoing explanation it is seen that the maximum upstream pressure adapted to be controlled by my device is determined by the number of disks used. The minimum upstream pressure adapted to be controlled is determined by the by-pass factor of plate 20, which factor is dependent upon the amount of clearance around its edge and the size of the orifice therethrough. The quantity or fixed delivery is controlled by the size and position of the holes in the disks in the upstream side.

In prior, sleeve type control devices, I have mentioned their tendency to vibrate or oscillate and to cut off the flow of liquid or gas under surges in the line. In all such devices sole dependence is had upon a spring or a weight to resist such tendencies. However, it is apparent that a spring sufficiently powerful to eliminate such objections would negative the result of permitting a control of the fluid delivery since there is no coaction between the regulating ports, the spring, the physical flow and characteristics of the fluid.

In my device, it will be seen that upon a sudden surge in the upstream pressure or sudden change in the downstream pressure the disks cannot be violently impelled to abnormally restrict the delivery of fluid therethrough due to the resistance of the fluid itself in the passages formed by the adjacent sides of the adjacent disks of the pile. Hence, while the disks quickly respond to reduce the flow upon a sudden surge in the fluid, they only move to the position for delivering the constant quantity and are not excited into vibration by reason of an unstable condition created through an abnormal condition in the fluid line.

Furthermore, it is to be noted that in my device two variable flow conditions exist at all times through the disk pile which is the quantity flow control element in the device. The major flow passage is between the disks and extends radially of the axis of the disk pile while a minor flow passage extends through the disks in the direction of their axis. The proportional decrease in the volume of flow between disks radial to the minor flow upon a movement of the disks toward each other and vice versa is not the same relatively to the decrease in flow through the passage axially through the disk pile. They are relatively variable in different ratios and are never influenced directly by an identical dynamic pressure characteristic in the flow line. This feature also contributes to the stability of my device under all conditions to deliver a fixed constant downstream flow without the objections noted in the sliding sleeve type devices heretofore in use.

It is, of course, obvious that my device will operate equally well at all angles, and is extremely simple and cheap to make and does not require expensive manufacturing of parts and complicated castings and is easily installed in any ordinary pipe line.

Having described my invention, I claim:

1. A fluid flow control device adapted to be positioned in a fluid conduit for preserving the flow constant comprising a pair of spaced members providing a fluid passage therebetween, means for mounting said members in a fluid conduit, said members arranged and adapted to be actuated by the dynamic pressure of the fluid for movement toward each other for modifying the flow of fluid therebetween, a flat bowed spring between said members adapted to yieldably urge said members apart and means connected to one of said members adapted to be influenced by the dynamic pressure of the fluid for tending to urge said member toward the other member, said last mentioned means being spaced from the walls of the conduit to permit passage of fluid therearound.

2. In a fluid conduit, means for supporting a row of disks therein with said disks appreciably spaced from the sides of the conduit to provide a fluid passage around the sides of the row, said disks being apertured to pass fluid therethrough in the direction of flow of the fluid, a device within the conduit on the downstream side of the row responsive to changes in the dynamic pressure of the fluid for movement in the direction of the normal flow of fluid in the conduit, said device and one of said disks being connected for movement together and yieldable means spacing the disk connected to said device and the disk of the row adjacent thereto for yieldably resisting movement of the disk upon movement of said device in the direction of the normal flow of fluid in the conduit.

3. In a fluid conduit flow control, means mounted therein arranged and adapted to pass the fluid in the conduit therethrough and formed and positioned to appreciably change the normal directional flow of the major portion of the fluid in the conduit while permitting passage of a minor portion only of fluid without appreciable change from the normal directional flow of the fluid in the conduit, supporting means movably mounting said flow control means for actuation of said flow control means to restrict the flow of the major portion of the fluid, a device connected to said flow control means and positioned within the conduit on the downstream side of said flow control means, said device being operatively responsive to an increase in the dynamic pressure of the fluid to actuate said flow control means to restrict the flow of the major portion of the fluid therethrough.

4. A fluid flow control device comprising a pair of spaced members connected for movement together in opposite directions, supporting means for mounting said members in a fluid conduit for movement of the members in the direction of flow of the fluid in the conduit under the influence of the dynamic pressure of the fluid, said supporting means being positioned between the members and formed to pass fluid in the conduit therethrough and means yieldably spacing one of said members from said supporting means for providing a fluid passage between the supporting means and the last-mentioned member.

5. In a construction as defined in claim 3, said supporting means being formed to support said last-mentioned member in a position spaced from the walls of the conduit whereby the fluid in the conduit is free to unobstructed flow of fluid between the sides of the conduit and said member.

6. A fluid flow control device comprising a plurality of disks adapted to be positioned in a fluid conduit, means yieldably spacing said disks apart for providing a fluid passageway therebetween, supporting means for securing said disks in the conduit positioned on the upstream side of said supporting means, said supporting means being apertured to provide for passage of fluid past the supporting means to the downstream side thereof, and means connected to one of said disks disposed on the downstream side of said supporting means arranged and adapted to be influenced by the dynamic pressure of the fluid on the downstream side of the supporting means for moving said disks toward each other for modifying the flow of fluid to said last-mentioned means.

7. In a fluid conduit, a pair of members therein spaced apart and arranged to provide a fluid passage therebetween extending in a direction generally transversely to the normal directional flow of fluid in the conduit and means for directing the major portion of the fluid generally radially inwardly toward the axis of the bore of the conduit to said passageway, said members each being provided with an aperture therethrough extending generally in the normal direction of flow of the fluid in the conduit adapted to pass only a minor portion of the fluid in the conduit, one of said members being responsive for movement toward the other member upon an increase in the dynamic pressure of the fluid in the conduit and means movably mounting the pressure responsive member for movement toward said other member whereby the major flow of fluid in said passageway will be modified upon an increase in the dynamic pressure of the fluid, and means yieldably spacing said members apart.

OTTO W. HAHN.